Patented Oct. 26, 1943

2,332,902

UNITED STATES PATENT OFFICE 2,332,902

PROCESS FOR CONCENTRATING AQUEOUS DISPERSIONS

Arend D'Angremond and Otto Bertram Schrieke, Medan, Sumatra, Netherland East Indies; vested in the Alien Property Custodian No Drawing. Application March 27, 1940, Serial No. 326,300. In the Netherlands October 27, 1939

2 Claims. (Cl. 260—822)

The invention relates to the concentrating of very different kinds of aqueous dispersions. In industry this concentrating is of special importance for thickening rubber latex, but also for thickening milk and the preparation of cream.

It is already known that such dispersions can be concentrated by evaporating, filtrating, centrifuging, by applying so-called creaming agents, or by freezing. However, these known methods present several disadvantages. The majority of these treatments require expensive apparatus. Moreover in most cases, one obtains a concentrated dispersion which no longer shows the same qualitative composition as the original liquid. For by centrifuging and creaming, the dispersion loses certain of its components, while in methods such as evaporation, filtration, or the application of creaming agents, it is first necessary to add to the dispersion alien substances such as protective colloids, anticoagulants, antioxidants, creaming agents, which are to be found again in the concentrate. Finally freezing a dispersion presents great difficulties, especially in the tropics.

According to the present invention, a concentrate is quickly obtained, which not only still contains all the non-aqueous components originally present in the unconcentrated liquid, but to which no new substances, or only a small quantity of them, are added.

The invention is based on the principle that the desired increase in concentration of the dispersion can be obtained by bringing the liquid into contact with those parts of plants, which have a high capacity of absorbing water, such as seeds, dried fruits, tubers, bulbs, roots, leaves, parts of stems, etc. The best results in this connection are obtained with seeds, because the other parts of plants mentioned sometimes have the disadvantage of bruising or even being pulverised during the treatment, whereby sieving the drying material is rendered difficult and the dispersion is soiled. The use of seeds is further advantageous because the skin of seeds is easily permeated by water, whereas many other substances do not permeate it. Consequently, on the one hand, no components are withdrawn from the dispersion, while on the other hand, matter from the seeds is prevented from entering the dispersion.

Many seeds, when placed in an aqueous dispersion, were found capable of extracting a large amount of water from this liquid. The quantity of water which can be absorbed by the seed, varies with the sort used; in several cases it amounts to 100–150% of the weight of the air-dry seeds. Therefore only seed will be used as example in the further specification.

The process according to the invention is preferably carried out as follows: The dispersion to be concentrated is put into a closed cylindrical vessel, which can rotate round its horizontally placed axis. The desired quantity of seed is weighed and likewise put into the vessel; then this is closed and put into motion.

The seeds now begin to swell, that is to say they extract water from the liquid, whereby on the one hand they grow in volume, and on the other hand the dry substance percentage of the dispersion increases. The rotation ensures that the seeds are continually brought into contact with another part of the liquid; moreover, the solid substances of the dispersion are thereby prevented from depositing themselves in a layer of poor permeability on the seed skins, which would retard the absorption of water. After a number of hours, e. g. eight, the seeds have extracted the maximum quantity of water from the dispersion. The rotation is then stopped and one drains off the thickened dispersion.

One is often restricted in the choice of the seed to be used, because many seed skins contain colouring-matter soluble in water, which would as a rule discolour the dispersion undesirably. This difficulty can be met with by using colourless seeds, or seeds without colouring-matter soluble in water. And again, some seeds have a very hard skin which impedes the absorption of water. In this case the seeds can be subjected beforehand to one of the well known methods such as mordanting, scouring off or slitting, through which the skin, all over, or in certain places, becomes more permeable.

The invention is made considerably more economical in its application, because after finishing the concentrating, the parts of plants, for instance the seeds are rinsed and then dried. After this they can be used again for a further treatment. As this drying and then swelling again, if done carefully, can be repeated several times without unfavourably affecting the capacity to absorb water, the consumption of the water extracting substances, for instance seed, is thus very much reduced.

The drying of the seed can be done by several methods. The simplest way is to spread the seed over a large surface and to let it dry in the sun. In case one wants the drying done in a quicker way, one can successfully use one of the methods in which a current of heated air is passed along the substance to be tried for instance on special drying-lofts, drying-frames, in fruit-driers, etc.

In many cases it will be desirable to add a preservative to the dispersion before the thickening according to the invention begins. The known agents, which are also used in the other methods of concentration can be applied therefor. In the case of rubber latex, ammonia is preferably used; at the same time this agent prevents the latex from coagulating during the treatment. By adding ammonia to the dispersion one also ensures that the seed does not germinate during the treatment. In case one wants to prevent this germinating when ammonia is not used, this can be done by killing the seed beforehand, e. g. by treating the seed with hot water or with an aqueous solution of formaldehyde or of chlorine during some hours. It has been observed that killing the seed beforehand has no unfavourable influence on its capacity to absorb water.

The properties of concentrates prepared according to the invention greatly resemble those of the products obtained by evaporation of the water. For then also, all the components of the original dispersion are still present in the concentrate. However, the addition of protective colloids—as is usually necessary in the evaporation process, and whereby the properties of the dispersion are also influenced—can be omitted in the process according to the invention.

If required the process according to the invention can be combined with one of the known methods for the concentrating of dispersions.

The process will be further illustrated by the following examples.

Example 1

1800 cm.$^3$ of plantation latex, to which as preservative so much ammonia was added, that the $NH_3$ content calculated on the latex was 0.75%, and which had a dry rubber content of 37.86%, was equally distributed in 18 bottles which could be closed. Thereupon different quantities of soja beans (Glycine Max Merr.) were put into these bottles. The bottles were now placed in an apparatus, which kept their contents in continuous motion. After respectively 4 hours, 8 hours and 24 hours, the experiment was interrupted and the contents of 6 bottles at a time were analysed according to the following scheme. The result of these tests was as follows:

| Number of grams of seed added to 100 cm.$^3$ latex | Dry rubber content of the concentrate in percent— | | |
|---|---|---|---|
| | After 4 hrs. | After 8 hrs. | After 24 hrs. |
| 5 | 39.84 | 40.44 | 40.60 |
| 10 | 41.78 | 43.18 | 43.06 |
| 20 | 45.30 | 49.46 | 49.38 |
| 30 | 49.10 | 54.76 | 54.46 |
| 40 | 52.82 | 60.86 | |
| 50 | 54.34 | 61.60 | |

From the above it is apparent, that the concentration of the dispersion can be increased at will by regulating the amount of seed to be added. If one takes larger quantities of seed than the maximum mentioned in the table, one soon gets a paste which can only be separated from the seed with difficulty.

The table also shows, that after eight hours of rotation practically no further increase of concentration is obtained.

Example 2

Latex with a dry rubber content of 34.65% was creamed with the aid of an aqueous dispersion of the flour of Amorphophallus-tubers (see for instance The Netherlands Patent No. 37,288). The cream obtained in this way was drained off after four days. The dry rubber content of the cream appeared to be 52.06%.

To 150 cm.$^3$ of this cream sufficient ammonia was added to make its content 0.7%; thereupon the mixture was placed in a bottle, in which 30 grams of peas (Pisum Sativum L.) had already been weighed. The bottle was then closed and slowly rotated. After 4½ hours the bottle was opened and the very viscous concentrate of the seed was separated and analysed. The dry rubber content now appeared to have increased to 67.80%.

Example 3

12 kg. latex, to which 0.7% ammonia had been added as preservative, were put into a cylindrical closed vessel. 2.5 kg. soja beans were then added. Hereupon the vessel was closed and rotated. The test was terminated after 8 hours. The original latex had a dry rubber content of 31.06%; 8.8 kg. of concentrate with a dry rubber content of 41.58% were obtained.

Example 4

To 5 bottles, each containing 100 cm.$^3$ conserved cow's milk, were respectively added:

| | Grams |
|---|---|
| (1) Soja beans | 20 |
| (2) Soja beans | 30 |
| (3) Soja beans | 40 |
| (4) Seeds of Vigna sinensis Endl. | 30 |
| (5) Green peas | 30 |

After 8 hours of rotation the dry substance content of these samples was determined. The result was:

| Sample | Dry substance in % |
|---|---|
| Non-treated milk | 13.62 |
| (1) | 17.85 |
| (2) | 21.07 |
| (3) | 25.05 |
| (4) | 19.12 |
| (5) | 18.60 |

This table shows that cow's milk can also be excellently thickened according to this process.

What we claim is:

1. The process of reducing the water content of rubber latex which comprises contacting the latex with dry, insoluble, absorbent, plant seeds and separating the seeds from the latex after water has been absorbed by said seeds.

2. The process of removing water from latex which comprises contacting a latex with dry, insoluble, absorbent plant parts, selected from a class consisting of seeds, fruits, tubers, bulbs, roots, leaves and stems, while agitating the mixture sufficiently to prevent the accumulation of colloidal matter on said plant parts, then separating said parts from the resulting concentrated latex.

AREND D'ANGREMOND.
OTTO BERTRAM SCHRIEKE.